United States Patent
Sisley et al.

(10) Patent No.: US 10,897,466 B2
(45) Date of Patent: Jan. 19, 2021

(54) SYSTEM AND METHOD FOR EXTERNALLY-DELEGATED ACCESS CONTROL AND AUTHORIZATION

(71) Applicant: Microsoft Technology Licensing, LLC, Redmond, WA (US)

(72) Inventors: Mark D. Sisley, Seattle, WA (US); Kerem Yuceturk, Bellevue, WA (US); Alexandru Dan Burst, Kirkland, WA (US); David Alexander Blyth, Seattle, WA (US); Merwan Vishnu Hade, Bellevue, WA (US); Samuel L. Banina, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 15/991,193

(22) Filed: May 29, 2018

(65) Prior Publication Data

US 2019/0306171 A1    Oct. 3, 2019

Related U.S. Application Data

(60) Provisional application No. 62/650,566, filed on Mar. 30, 2018.

(51) Int. Cl.
*H04L 29/06* (2006.01)
*G06F 21/62* (2013.01)
(Continued)

(52) U.S. Cl.
CPC ............ *H04L 63/102* (2013.01); *G06F 21/10* (2013.01); *G06F 21/629* (2013.01);
(Continued)

(58) Field of Classification Search
CPC ........ G06F 21/629; H04L 63/10; H04W 12/08
See application file for complete search history.

(56) References Cited

U.S. PATENT DOCUMENTS

| 8,656,465 B1 | 2/2014 | Fong-Jones |
| 2002/0083340 A1 * | 6/2002 | Eggebraaten ......... H04L 63/101 726/1 |

(Continued)

OTHER PUBLICATIONS

Nidhiben Solanki • Wei Zhu • I-Ling Yen • Farokh Bastani • Elham Rezvani; Multi-tenant Access and Information Flow Control for SaaS; 2016 IEEE International Conference on Web Services (ICWS) (pp. 99-106); (Year: 2016).*

(Continued)

*Primary Examiner* — Kari L Schmidt
*Assistant Examiner* — Chao Wang
(74) *Attorney, Agent, or Firm* — Fiala & Weaver P.L.L.C.

(57) ABSTRACT

Methods for externally-delegated access control and authorization of applications and resources are performed by systems and devices. A request for access by a user to a resource of a first application is received from a client device. A memory data structure that associates the resource of the first application with an application identifier and permission information is accessed to obtain the application identifier and the permission information. A query is provided to a second application, identified by the application identifier, which has a different authorization model than the first application. The query includes a user identifier and the permission information. The second application performs a permission check and authorization for the user based on the query. A query response that includes an access indication is the received from the second application. The request is granted or denied based on the access indication.

16 Claims, 5 Drawing Sheets

(51) Int. Cl.
*H04W 12/08* (2009.01)
*G06F 21/10* (2013.01)

(52) U.S. Cl.
CPC .......... *G06F 21/6218* (2013.01); *H04L 63/08* (2013.01); *H04L 63/10* (2013.01); *H04W 12/08* (2013.01)

(56) References Cited

U.S. PATENT DOCUMENTS

| | | | | |
|---|---|---|---|---|
| 2012/0054625 | A1* | 3/2012 | Pugh | H04L 67/02 715/736 |
| 2013/0086669 | A1* | 4/2013 | Sondhi | H04W 12/0608 726/8 |
| 2013/0276142 | A1 | 10/2013 | Peddada | |
| 2013/0311829 | A1* | 11/2013 | Beskrovny | G06F 11/3688 714/32 |
| 2015/0312256 | A1* | 10/2015 | Seibert, Jr. | H04L 63/102 726/8 |
| 2016/0019401 | A1 | 1/2016 | Kumar et al. | |
| 2016/0065555 | A1* | 3/2016 | Branden | H04L 63/0807 726/7 |
| 2016/0197962 | A1* | 7/2016 | Winn | H04L 63/20 713/168 |
| 2016/0248773 | A1 | 8/2016 | Bildoy | |

OTHER PUBLICATIONS

Obinna Ethelbert • Faraz Fatemi Moghaddam • Philipp Wieder • Ramin Yahyapour; A JSON Token-Based Authentication and Access Management Schema for Cloud SaaS Applications; 2017 IEEE 5th International Conference on Future Internet of Things and Cloud (FiCloud) (pp. 47-53); (Year: 2017).*

Dancheng Li • Cheng Liu • Qiang Wei • Zhiliang Liu • Binsheng Liu; RBAC-Based Access Control for SaaS Systems; 2010 2nd International Conference on Information Engineering and Computer Science (pp. 1-4); (Year: 2010).*

"International Search Report and Written Opinion Issued in PCT Application No. PCT/US2019/022380", dated May 9, 2019, 11 Pages.

* cited by examiner

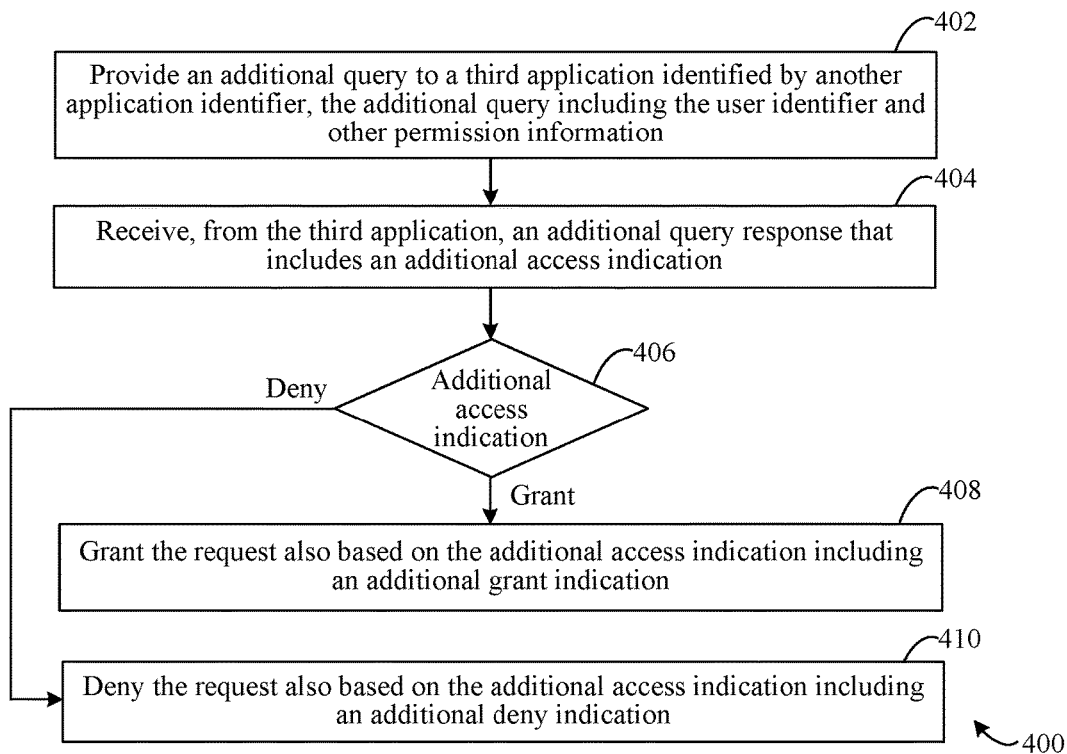
FIG. 4
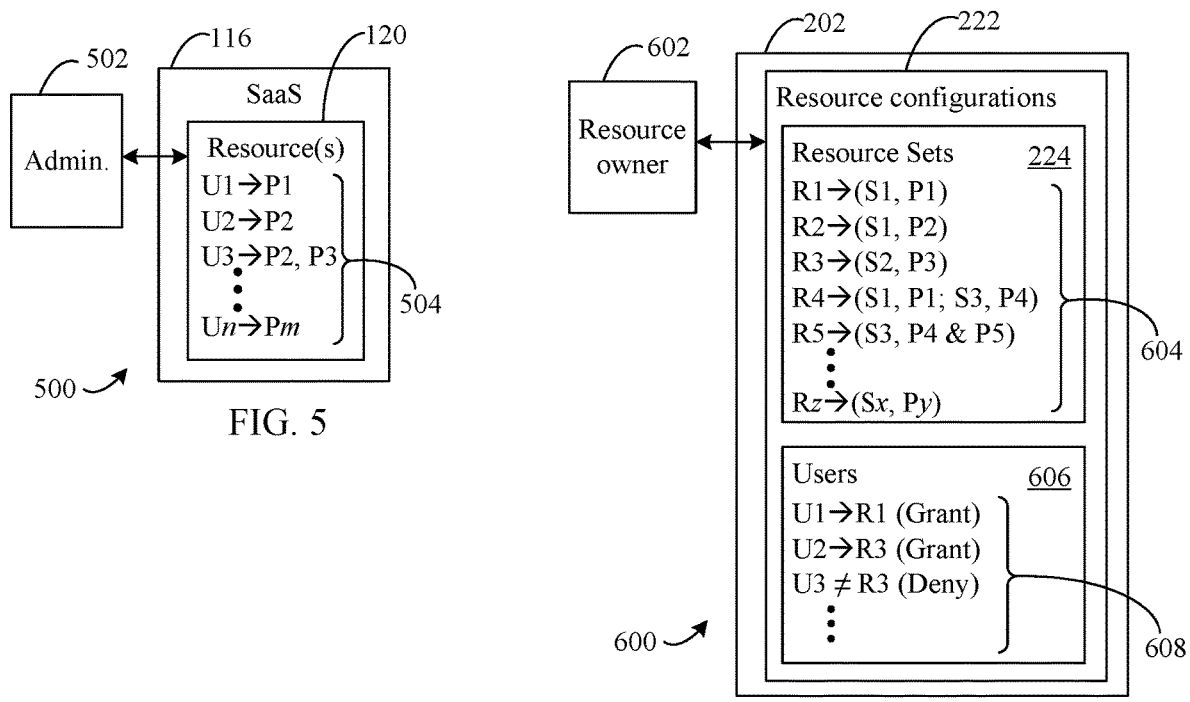
FIG. 5
FIG. 6

SYSTEM AND METHOD FOR EXTERNALLY-DELEGATED ACCESS CONTROL AND AUTHORIZATION

CROSS-REFERENCE TO RELATED APPLICATION(S)

The present application claims priority to U.S. Provisional Patent Application No. 62/650,566, entitled "SYSTEM AND METHOD FOR EXTERNALLY-DELEGATED ACCESS CONTROL AND AUTHORIZATION," filed on Mar. 30, 2018, the entirety of which is incorporated by reference herein.

BACKGROUND

Multi-user system-as-a-service (SaaS) applications often implement permission or access control models to resources defined therein. Across SaaS applications, there is frequently no centralized authorization store or model, making it difficult for users to keep the isolated models synchronized.

Prior approaches to solving the isolated model problem involve users manually (or in an automated fashion) synchronizing the models together (e.g., 1-way or 2-way). This approach has several limitations, including that the mapping may be static, out-of-date, or lossy (i.e., some granularity of the two models may be lost). Furthermore, this approach does not scale when the solution needs to synchronize with multiple other different SaaS applications and/or third parties.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods for externally-delegated access control and authorization of applications, such as SaaS applications, and resources thereof are described herein. For example, the described embodiments provide for techniques and mechanisms used by a SaaS applications/services to delegate the authorization of resource-based actions (e.g., editing, deleting, invoking a workflow, etc.) to another application/service and/or a third party.

For instance, an access control and authorization system is described that includes a processor and a memory that stores program code of a first application. The program code of the first application is configured to be executed by the processor. The program code of the first application includes first program code configured to receive a request for access by a user to a resource of the first application. The request may be from a client device. The program code of the first application also includes second program code configured to access a memory data structure that associates the resource of the first application with an application identifier and permission information. Accordingly, the application identifier and the permission information may be obtained from the memory data structure. The program code of the first application also includes third program code configured to provide a query to a second application identified by the application identifier. The query may include a user identifier and the permission information. The second application may have a different authorization model than the first application, and may perform a permission check and/or authorization for the user based on the query. The third program code is configured to receive a query response that includes an access indication. The query response may be provided from the second application. The program code of the first application also includes fourth program code being further configured to grant the request based on the access indication including a grant indication, and to deny the request based on the access indication including a deny indication.

Embodiments directed to methods for externally-delegated access control and authorization, and directed to computer-readable storage medium having program instructions recorded thereon that, when executed by a processing device, perform such methods, are also contemplated herein.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart for externally-delegated access control and authorization of applications, in accordance with an example embodiment.

FIG. 5 shows a block diagram for user permission configurations, in accordance with an example embodiment.

FIG. 6 shows a block diagram for resource permission configurations, in accordance with an example embodiment.

Figure 1:
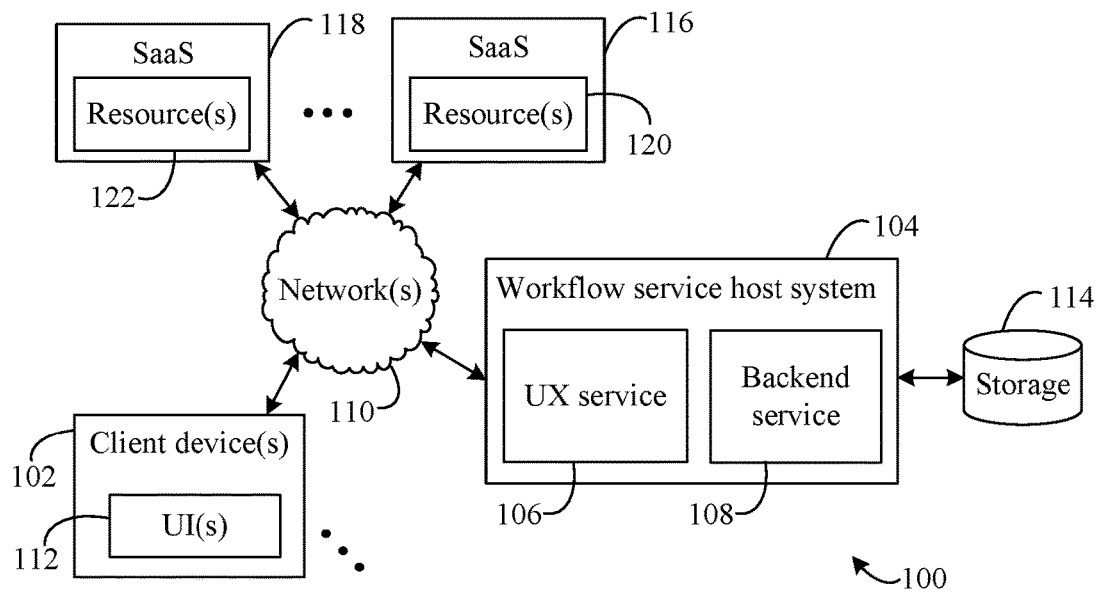
FIG. 1 shows a block diagram of a networked system for externally-delegated access control and authorization of applications, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In embodiments, the term "application" may be used to refer to an application, a service, or an instance(s) of an application or service, as well as different types of applications and/or services, including but without limitation, SaaS applications/services, any type of cloud applications/services, productivity applications/services, and/or the like.

The term "application," as used herein in the context of the described embodiments, may be used to encompass software applications, SaaS applications, services, and/or the like. That is, when an "application" is referred to for externally-delegated access control and authorization, it is contemplated that various types of applications and services are applicable to the embodiments. Likewise, in embodiments for which a "service" is described, "applications" are also contemplated.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for externally-delegated access control and authorization of applications. Specifically, Section II.A describes example embodiments for systems and devices performing methods for externally-delegated access control and authorization, and Section II.B describes example embodiments for resource configurations and permissions resources. Section III below describes example mobile device and computing device embodiments that may be used to implement features of the embodiments described herein. Section IV below describes additional examples and advantages, and Section V provides some concluding remarks.

II. Example Embodiments for Externally-Delegated Access Control and Authorization of Applications Methods, systems, apparatuses, devices, and computer program products are provided for externally-delegated access control and authorization of applications, such as SaaS applications/services. Such embodiments enable flexible and dynamic access control and authorization without requiring synchronization between isolated authorization models of diverse applications/services. That is, an application that delegates access control and authorization to another application may do so without the application having knowledge of access control and authorization semantics, and control mechanisms, of the other application. For instance, the described advantages may be realized through resource-embedded scenarios where application/service access control semantics (e.g., resource run permissions, edit permissions, etc.) are linked to other applications/services that include their own access control mechanisms. As an example, a workflow of a workflow service may be linked to control mechanisms of information sharing service administrators and members, "Internet of Things" (IoT) center rule owners, and/or the like.

Users creating or modifying a resource in a SaaS application are enabled to select and configure authorization parameters for actions on the resource. Actions may include, without limitation, editing, invoking, deleting, viewing, etc. Accordingly, the resource permissions of SaaS services are mapped to the permission schemes of third parties. These permission assignments can be automatically pre-configured (or even mandated/forced) by the SaaS service depending on the details of the definition of the resource.

When a user attempts, by request, to perform an action requiring an access control check for the resource, the described embodiments provide for communication to the configured third party for the authorization parameters of the request, including but not limited to: user identity, the capability and resource requested, time, IP address or location, etc. The third party can use any or all of the provided parameters to make the access control decision. In embodiments, the SaaS service may provide the minimum number of authorization parameters to the third party for authorization where parameters may be extracted from the request and/or from resource configurations persisted by the SaaS service.

The described embodiments do not require a centralized service to control access to other services by granting clients direct access thereto. Rather, service-to-service authorizations are enabled. The user/client is enabled to be authorized for taking actions on a resource without being aware that communications between SaaS services are happening— that is, external delegation of access control and authorization may be transparent to a user. The techniques provided herein are enabled to handle the translation of two (or more) different access control mechanisms and models in providing access and authorization. As an example, a workflow in a workflow service (e.g., a first SaaS application) may be configured to allow editing access to the workflow for a user when the user is a member of an administrator group for an information sharing service, e.g., applications/services of Office 365® from Microsoft Corporation of Redmond, Wash., and/or the like, also referred to as information sharing applications, (e.g., a second SaaS application) for a particular site. The access control configuration is not replicated centrally, e.g., at a server or in the cloud, or any other shared location. In the absence of the embodiments described herein, the workflow service would need to synchronize all changes made to the information sharing service access control configuration to handle administrators being added.

Workflows may include various types of defined processes. For example, a workflow may be a process by which a user requests approval from a manager for access to a document in a library, a process by which a user generates or modifies a blog entry that requires managerial approval to be published, a process by which changes to a list, document, or library cause an email to be generated and provided to one or more user email accounts, etc. Workflows may be associated with, or have portions that interact with, various applications/services, such as but not limited to, those described herein.

Continuing with the example above, the workflow service receives a request to edit a particular workflow. The externally delegated authorization configuration instructs the workflow service to directly query the information sharing service at the time of the user's request. The query may include, without limitation, one or more of the details of the request (e.g., user identity, time, permission requested, details of the change, IP address used by the user, etc.). Thus, all decision making for authorization and access is delegated to the information sharing service to determine whether the workflow service should allow/authorize the action/activity. Accordingly, the workflow service is not required to have any knowledge about access control configuration for other applications/services, yet is still enabled to properly grant or deny access/authorization for actions.

Accordingly, embodiments provide for the ability of users/creators of a first application to share a resource thereof with other users in permissions lists of different applications such that every user who has access to the permissions lists automatically has access to the resource of the first application. These described techniques obviate the need for a creator/owner of a resource for the first application to explicitly specify individuals or groups for access to the resource. These described techniques further improve resource authorization and access in that different applications and services often have their own notion of groups that may differ from the application for which the resource is created. Moreover, membership of these diverse groups may always changing where users join, leave, change permission levels, etc., and the state of the group is maintained by its application directly. Still further, such groups may not be trusted security groups, e.g., groups that span a number of applications/services in a cloud hosting platform, so there is no way for an external or diverse application to find and share resources with them.

The described embodiments for externally-delegated access control and authorization ensure that every user who has access to a list or library always has access to a resource of an application. For instance, the properties of an application may be configured to provide a mechanism for a user to share a resource using externally delegated authorization. An owner/creator of a resource is enable to select/provide an application, a site or location of the application, and a list, document, or library for access permissions. It should be noted that the described delegated sharing may apply to different types of permissions such as, but not limited to, "owner/creator," "run-only user," etc. For example, an owner of a resource may decide to specify an entire list of users as delegated owners of the resource. This enables any user to edit the resource. Likewise, an owner of a resource may decide to specify an entire list of users as delegated "run-only" users such that any user can run or execute the resource (e.g., as in the case of workflows intended to be directly triggered by a set of users).

Accordingly, when designating an owner or run-only user to be given access, either an individual/security group or a delegated source may be selected. When selecting a delegated source, the owner/creator may be enabled to select a delegated group such as a site/location and a list (or document, library, etc.), a team and a corresponding channel, and/or the like.

Discovery and/or listing of delegated workflows by users may be done in the context of the hosting application, i.e., the application or service for which the external delegation for access and authorization is provided and performed. These hosting applications/services include contexts about the site/location and list, documents, libraries for which a user is in, and can pass such information to the application for the resource to be accessed in order to show applicable resources.

In other words, the embodiments disclosed herein provide for externally-delegated access control and authorization of applications. These and further embodiments are described in greater detail as follows.

A. Example Embodiments for Systems and Devices Performing Methods for Externally-Delegated Access Control and Authorization In embodiments, systems and devices may be configured in various ways for externally-delegated access control and authorization. For instance, FIG. 1 is a block diagram of an access and authorization system 100 ("system 100" herein), according to embodiments. System 100 is configured to enable externally-delegated access control and authorization for applications/services and resources thereof, according to embodiments. As shown in FIG. 1, system 100 includes a client device(s) 102, a workflow service host 104, a SaaS host 116, and a SaaS host 118 which may communicate with each other over a network 110. It should be noted that any numbers of client devices, SaaS hosts or SaaS instances, and/or workflow service hosts may be present in various embodiments. Additionally, any combination of the components illustrated in FIG. 1 may be present in system 100, according to embodiments.

As noted above, client device 102, workflow service host 104, SaaS host 116, and SaaS host 118, are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

Client device(s) 102 may be any type of computing device or computing system, including without limitation, a terminal, a personal computer, a laptop computer, a tablet device, a smart phone, a game console, etc., that may be used by users to interact with applications/services, including to create, access, modify, delete, etc., resources of the applications/services. Likewise, client device(s) 102 may be used by owners of resources and administrators of applications/services to respectively configure permissions. As described herein, external delegation of access control and authorization may utilize an application of workflow service host 104 as well as other applications/services such as SaaS host 116 and/or SaaS host 118. Client device 102 is configured to provide user requests for resources over network 110 to workflow service host 104 to enable users to access such resources, as described in further details below. In embodiments, a user may utilize a UI 112 for providing the request to workflow service host 104. In embodiments, client device 102 may include a stored instance of such a UI, e.g., received from workflow service host 104, SaaS host 116, and/or SaaS host 118, or as a component of client device 102. In embodiments, UI 112 may be any type of service/application UI, browser, client or electronic communication application, messaging application, portal, and/or the like, and may be related to a user experience component or a front-end component of an application of workflow service host 104, SaaS host 116, and/or SaaS host 118.

In embodiments, client device 102 may communicate with workflow service host 104, SaaS host 116, and/or SaaS host 118 via UI 112. A request from client device 102 for access to a resource of an application hosted by workflow service host 104 may be transmitted to workflow service host 104, or may be transmitted to SaaS host 116 and/or SaaS host 118 and re-directed to workflow service host 104, where the request is received. In some embodiments, UI 112 may be a UI for SaaS host 116 and/or SaaS host 118 where UI 112 redirects the request to workflow service host 104.

SaaS host 116 and/or SaaS host 118 may respectively comprise one or more server computers or computing devices, which may include one or more distributed or "cloud-based" servers. SaaS host 116 and/or SaaS host 118 may be configured to host one or more SaaS applications. SaaS applications may include, without limitation, workflow services, information sharing services, email services, productivity applications, social media services, etc. Accordingly, SaaS host 116 and/or SaaS host 118, or storage associated therewith, may respectively include at least one resource(s) 120 and/or resource(s) 122, which may be permissions resources. Resource(s) 120 and/or resource(s) 122 may each include permissions for users in the form of lists, documents, libraries, etc. A permissions list may be an access control list (ACL). Permissions may include sets of user identifiers linked with permissions in accordance with authorization models specific to SaaS host 116 and/or SaaS host 118, or to SaaS applications hosted thereon.

Applications hosted by SaaS host 116 and/or SaaS host 118 may respectively comprise one or more application programming interfaces (APIs). These APIs may be exposed to allow API calls (e.g., queries) from workflow service host 104, as described herein. APIs may be specific to the hosted applications, or may be common/standard APIs configured to accept calls from workflow service host 104. In either API scenario, queries/API calls may be structured and generalized such that few queries/API calls, or even a single query/API call, may be implemented to improve scaling of externally-delegated access control and authorization to any number of delegated-to applications.

Workflow service host 104 may comprise one or more server computers or computing devices, which may include one or more distributed or "cloud-based" servers. Workflow service host 104 may also include internal and/or external storage, such as but not limited to, an external storage 114. Any internal and/or external storage may be distributed, according to embodiments. Workflow service host 104 is configured to host applications/resources such as workflows (not shown for clarity/brevity, but described in further detail below). Such applications/resources may be embedded with other external applications, such as information sharing services, email services, productivity applications, social media services, etc. It is contemplated herein that any number of applications may be stored and/or executed by workflow service host 104. Remote databases or storage, such as storage 114, communicatively connected via network 110, may be utilized as part of workflow service host 104.

Workflow service host 104 is configured to receive requests initiated from client devices, such as with UI 112 of client device 102 via network 110 to access or take action on resources thereof. For example, a user that desires to edit or run a workflow may provide a request for the workflow. The request may be received by workflow service host 104 which is configured to externally delegate the access and authorization determination to another application, e.g., an applications hosted by SaaS host 116 and/or SaaS host 118. Delegation may be performed utilizing resource configurations, described in further detail below, which may be stored in workflow service host 104 and/or storage 114.

As illustrated, workflow service host 104 includes user experience (UX) service 106 which may be a user experience frontend of workflow service host 104, and a backend service 108. UX service 106 may be configured to receive requests for access to resources from users via their client devices such as client device 102, and to provide back indications of determinations for allowing/denying access. UX service 106 may include a UI(s), e.g., as described for UI 112. Backend service 108 may be implemented in hardware or hardware combined with one or both of software and/or firmware, and may be configured to perform any functions/operations described herein for externally-delegated access control and authorization, as described in further detail below. Such functions/operations may include accessing resource configurations and obtaining information therein, as well as querying an external application for an indication of whether or not a request of a user should be granted or denied.

Note that as described herein, embodiments are applicable to any type of system where an application/service communicates with other applications/services over a network for externally-delegated access control and authorization. One example is where the workflow service host 104 is a "cloud" application or service in a network architecture/platform. A cloud platform includes a networked set of computing resources, including servers, routers, etc., that are configurable, shareable, provide data security, and are accessible over a network such as the Internet. Cloud applications run on the resources, often atop operating systems that run on the resources, for entities that access the applications, and/or resources thereof, over the network. A cloud platform may support multi-tenancy, where cloud platform-based software services multiple tenants, with each tenant including one or more users who may share common access to software services of the cloud platform, but where permissions for certain applications and resources may be determined and regulated by owners thereof, and where groups of users may have different levels of access permissions. Furthermore, a cloud platform may support hypervisors implemented as hardware, software, and/or firmware that run virtual machines (emulated computer systems, including operating systems) for tenants. A hypervisor presents a virtual operating platform for tenants.

Accordingly, a workflow service host system, such as workflow service host 104, may be configured in various ways for improvements and enhancements using externally-delegated access control and authorization.

Figure 2:
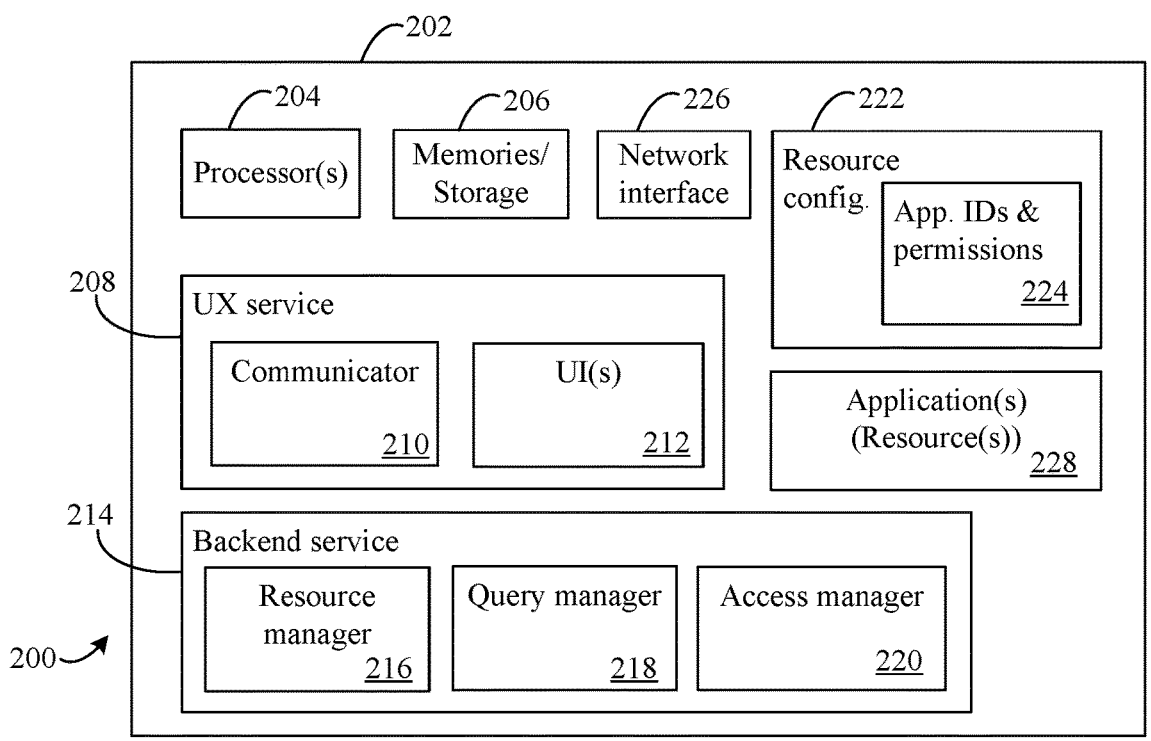
FIG. 2 shows a block diagram of a host system and application for externally-delegated access control and authorization of applications, according to an example embodiment.

For example, FIG. 2 is a block diagram of a workflow service host system 200 ("system 200" herein) configured for externally-delegated access control and authorization. System 200 is an embodiment of system 100 of FIG. 1. System 200 is described as follows.

System 200 includes a workflow service host 202, which may be an embodiment of workflow service host 104 of FIG. 1, and may be any type of server computer or computing device, as mentioned elsewhere herein, or as otherwise known, including cloud-based server implementations. As shown in FIG. 2, system 200 and workflow service host 202 include one or more of a processor ("processor") 204, one or more of a memory and/or other physical storage device ("memory") 206, one or more network interfaces ("network interface") 226. System 200 and workflow service host 202 also include a UX service 208 that may be an embodiment of UX service 106 of FIG. 1, and a backend service 214 that may be an embodiment of backend service 108 of FIG. 1. System 200 and workflow service host 202 include resource configurations 222, and an application(s) 228. System 200 and workflow service host 202 may also include additional components (not shown for brevity and illustrative clarity) including, but not limited to, components and subcomponents of other systems herein, as well as those described below with respect to FIGS. 3-6, such as an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of UX service 208 and/or backend service 214, which may be implemented as computer program instructions for externally-delegated access control and authorization, etc., as described herein. Memory 206 is configured to store such computer program instructions/code, as well as to store other information and data described in this disclosure including, without limitation, resource configurations, applications, resources, UIs, etc. In some embodiments, storage 114 of FIG. 1 may also be included in system 200, e.g., as a portion of memory 206.

Network interface 226 may be any type of wired and/or wireless network adapter, modem, etc., configured to enable system 200 to communicate with other devices over a network, such as communications between system 200 and other devices utilized in embodiments, such as described above with respect to FIG. 1 over a network such as network 110.

Resource configurations 222 may include entries for one or more resources, such as application identifiers and permissions 224. In embodiments, resource configurations 222 may comprise one or more ACLs. Each entry may include, without limitation, information for the resource being requested (e.g., a name or other identifier), delegate application information such as an application identifier, an application name, an application location (e.g., an internet protocol (IP) address or a uniform resource locator (URL) or the like), a contract version for queries, a resource identifier, etc., as well as permissions information such as a type of permission, an identifier for a value(s) to be checked, etc. Resource configurations 222 may be a memory data structure, and may include entries as resource sets associated with a given resource. Resource configurations 222 may be persistently stored by workflow service host 202, e.g., in memory 206. It is contemplated herein that any type of data structure may be used to store and associate information as relates to resource configurations herein, including without limitation, various types of lists, sets, databases, tables, etc.

Application(s) 228 may include, without limitation, any type of application described herein that may be hosted by workflow service host 202, including workflow services, SaaS applications, etc. Application(s) 228 may also include resources. Resources may be workflows, e.g., in the case of workflow service host 202, or other types of resources related to different applications in other embodiments. Resources may also include permissions for users in the form of lists, documents, libraries, etc., as described with respect to resource(s) 120 and/or resource(s) 122 of FIG. 1, in embodiments where a different, external application delegates access and authorization operations to application(s) 228 of workflow service host 202.

UX service 208 includes a plurality of components for performing the techniques described herein for externally-delegated access control and authorization. As shown, UX service 208 includes a communicator 210 and a UI(s) 212. While shown separately for illustrative clarity, in embodiments, communicator 210 and UI(s) 212 may be combined together and/or as a part of other components of system 200. In some embodiments, less than all of the components of UX service 208 illustrated in FIG. 2 may be included. In software implementations, one or more components of UX service 208 and/or workflow service host 202 may be stored in memory 206 and may be executed by processor 204.

Communicator 210 is configured to receive requests from users for access to resources, and to transmit indications of allowance or denial of requests to users. For instance, communicator 210 may be configured to receive requests and provide responses via a UI of UI(s) 212 that may be provided to client device as described above with respect to FIG. 1. A UI of UI(s) 212 when provided to a client device may enable a user through a selectable option to select a resource for the request. In an embodiment, communicator 210 is configured to receive a request for access by a user to a resource of a first application, e.g., application(s) 228 and resource thereof such as a workflow, from a client device. Communicator 210 may be further configured to receive another request for access by the same, or another user, to another resource of the first application from another client device.

Backend service 214 includes a plurality of components for performing the techniques described herein for externally-delegated access control and authorization. As shown, backend service 214 includes a resource manager 216, a query manager 218, and an access manager 220. While shown separately for illustrative clarity, in embodiments, one or more of resource manager 216, query manager 218, and/or access manager 220 may be combined together and/or as a part of other components of system 200. In some embodiments, less than all of the components of backend service 214 illustrated in FIG. 2 may be included. In software implementations, one or more components backend service 214 may be stored in memory 206 and may be executed by processor 204.

Resource manager 216 may be configured extract parameters and information, as described herein, from a request for access to a resource that is received by communicator 210. As noted above, when a user attempts, by request, to perform an action requiring an access control check for the resource, requests may include a user identity, the capability and resource requested, the request time, an IP address or location, etc. Based on the extracted parameters and information, resource manager 216 is configured to access a memory data structure such as resource configurations 222 that associates the resource of the first application (e.g., application(s) 228 and resource thereof) with an application identifier and permission information, such as described with respect to application identifiers and permissions 224. Then, resource manager 216 is configured to obtain the application identifier and the permission information from the memory data structure.

Requests may be externally delegated to different applications in embodiments, and the memory data structure may also associate another resource of the first application with another application identifier and other permission information of a third application. Accordingly, resource manager 216 is configured to access the memory data structure, and obtain the other application identifier and the other permission information from the memory data structure.

Query manager 218 may be configured to generate queries, API calls, information requests, and/or the like, for provision to an application for which authorization will be externally delegated. A query from an application may include a call to an exposed API of another application. Queries may also, or alternatively, include other query mechanisms and procedures as would be understood by persons of skill in the relevant art(s).

Queries may be generated based on one or more of a contract for communication with the delegated-to application, an application identifier and permission information obtained by resource manager 216, parameters extracted from the user query by resource manager 216, and/or the like. Queries may be generated to include one or more access/permission requests and associated permission information for resources. Query manager 218 may be configured to provide a query to a second application (e.g., a SaaS application hosted by SaaS host 116 of FIG. 1) identified by the application identifier. The query may include a user identifier and the permission information, in embodiments. Query manager 218 may be configured to receive a response to the query that includes an access indication from the second application.

Requests to be externally delegated to different applications in some embodiments accordingly require query manager 218 to be configured to provide another query to a third application (e.g., a SaaS application hosted by SaaS host 118 of FIG. 1), the other query including the identifier of the user (or an identifier of another user) and the other permission information for the third application. Query manager 218 may be configured to receive a response to the other query from the third application that includes another access indication.

As noted above, an application may delegate access control and authorization to another application without the application having knowledge of access control and authorization semantics, and control mechanisms, of the other application. In the context of FIGS. 1 and 2, query manager 218 may provide a query to, and receive a response from, either of SaaS host 116 and/or SaaS host 118 without requiring any indications as to how the authorization is performed by these SaaS hosts. That is, queries need only to maintain a minimum amount of information identifying an application for delegation and its linked permissions information, as is persisted in resource configurations 222. It should be noted that the permissions information maintained does not include actual values/data to be verified, in embodiments, but rather indications of which values/data should be verified internally by the application to which the access control and authorization is delegated. Accordingly, the delegating application may remain agnostic as to how authorization is actually performed at the delegated-to application. From the perspective of the delegated-to application, responses to queries may be generated with grant or deny indications based on the internally performed authorization, and provided to the delegating application.

Thus, in a scenario where a delegated-to application adds users, access permission levels for users, groups, etc., no changes or synchronizations are required at the delegating application.

Access manager 220 may be configured to grant or deny requests based on access indications, as described above, for any resource request for which access and authorization was delegated to any external application. Access manager 220 may be configured to determine whether to grant or deny requests based on query responses received by query manager 218. If a request is granted, a user is provided access to the requested resource to perform actions thereon; if a request is denied, access is not permitted.

Determinations made by access manager 220 may be communicated to requesting client devices by communicator 210.

In some embodiments, authorization for access to a resource may be delegated to more than one other application. For example, the memory data structure of resource configurations 222 described above may also associate the resource of an application with an application identifier of a third application and permission information thereof. Query manager 218 is configured to provide an additional query to the third application identified by the other application identifier, where the additional query includes the identifier of the user and the other permission information for the third application. Query manager receives an additional response to the additional query that includes an additional access indication from the third application. Access manager 220 is configured to grant or deny the request also based on the additional access indication (as well as the access indication described above from the second application).

In some embodiments, a user may provide a communication to SaaS host 116 and/or SaaS host 118 for an enumeration of workflows that the user may access. In this example, SaaS host 116 and/or SaaS host 118 may provide the communication, or indicia thereof, to workflow service host 104, e.g., to backend service 214. Backend service 214 may be configured to provide a query(ies) back to SaaS host 116 and/or SaaS host 118 to determine if the user has access to any such resources, as similarly described above for user requests to access resources of applications hosted by workflow service host 104. Based on the response to the query(ies), backend service 214 may provide an indication of resources that the user may access to SaaS host 116 and/or SaaS host 118.

UX service 208 and backend service 214 may operate in various ways to enable externally-delegated access control and authorization. For instance, the operations of system 100 of FIG. 1 and system 200 of FIG. 2, along with their respective components and subcomponents, may be conceptualized as steps in methods, flowcharts, and/or flow diagrams for externally-delegated access control and authorization, according to embodiments. That is, a computer-implemented method may be performed by components of workflow service host 104 and/or workflow system host 202, according to embodiments.

Figure 3:
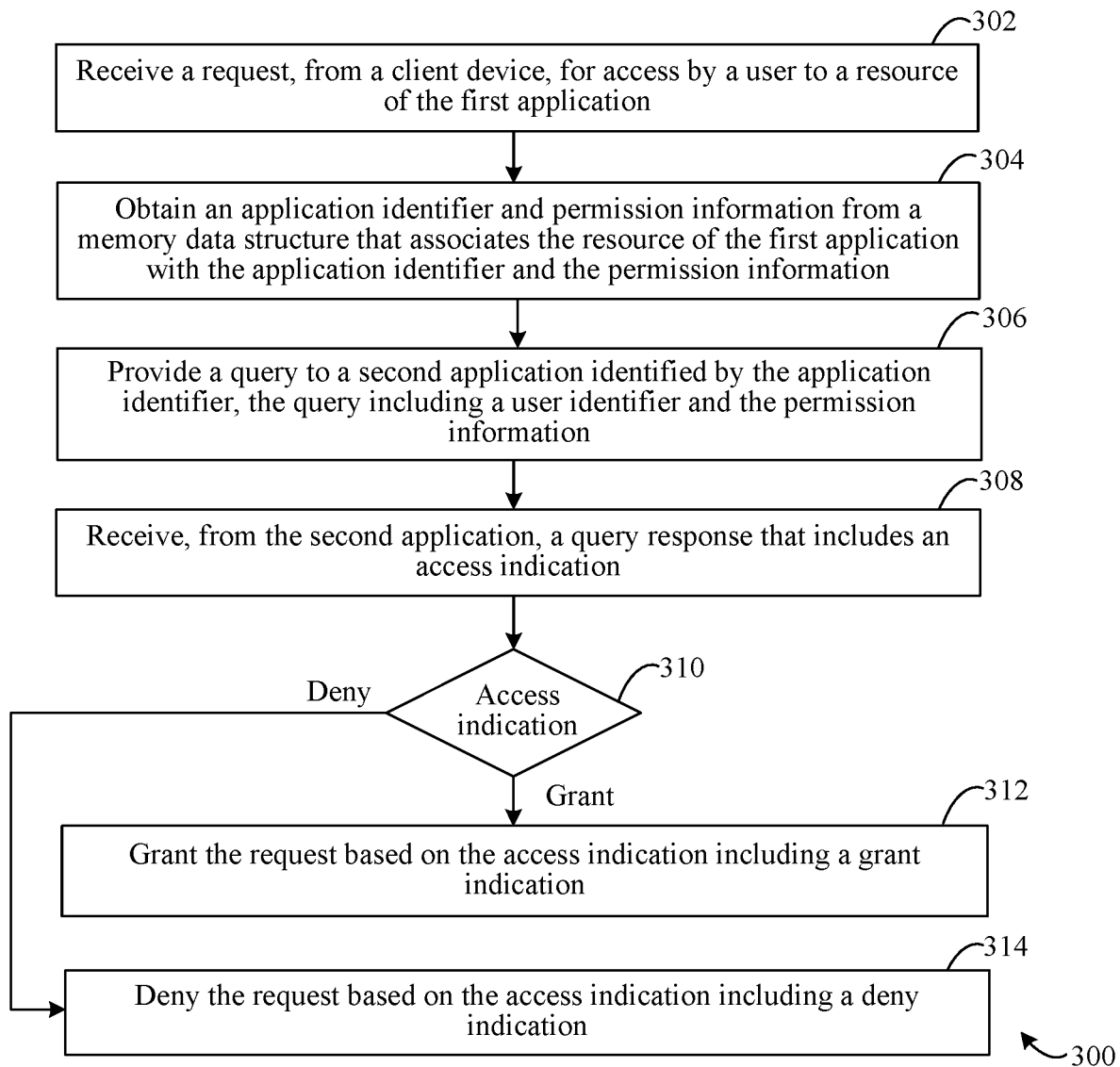
FIG. 3 shows a flowchart for externally-delegated access control and authorization of applications, in accordance with an example embodiment.

FIG. 3 shows a flowchart 300 for externally-delegated access control and authorization, in accordance with an example embodiment. UX service 208 and/or backend service 214 of workflow system host 202 in system 200 may operate according to flowchart 300. Further structural and operational examples will be apparent to persons skilled in the relevant art(s) based on the following description. Flowchart 300 is described as follows with respect to system 100 of FIG. 1 and system 200 of FIG. 2.

Flowchart 300 begins at step 302. In step 302, a request is received, from a client device, for access by a user to a resource of the first application. For instance, communicator 210 of workflow system host 202 in system 200 may be configured to receive a request. The request may be from client device(s) 102 which are remote to workflow system host 202 and/or to the first application. The request may be for user access to a resource of an application, such as but not limited to, resource(s) 122 of SaaS application of SaaS host 118 as shown in FIG. 1. The request may be received from across network 110 from the client device. In embodiments, the first application is a workflow development application, the resource of the first application is a workflow, and the permission information is associated with a resource of the second application that is referenced by the workflow.

In step 304, an application identifier and permission information are obtained from a memory data structure that associates the resource of the first application with the application identifier and the permission information. For example, resource manager 216 may be configured to obtain information from application identifier and permission 224, that is associated with the resource of the first application, in resource configurations 222. In embodiments, such information may be stored in an ACL. Further details and embodiments regarding data structures, application identifiers, and permission information is provided in the next subsection with respect to FIGS. 5-6.

In step 306, a query is provided to a second application identified by the application identifier, the query including a user identifier and the permission information. For instance, query manager 218 is configured to generate and provide a query to the second application associated with the application identifier. The query may include a user identifier and the permission information obtained in step 304, where the permission information may include indications or identifiers of the first application and/or the resource requested. It is contemplated herein that more than one set of permission information may be provided in queries.

In embodiments, the second application may have a different type of authorization than the first application. Accordingly, query manager 218 is configured to generate and provide queries that are extensible across different authorization types and/or platforms. In embodiments, a contract may be used that provides criteria for receiving and responding to queries. This provides the capability to externally delegate access control and authorization for resources of applications even when the external delegation is performed against an application that is different from the requested application and resource, and has different authorization protocols/mechanisms. In embodiments, the second application may be an information sharing application, and the resource of the second application may be one of a list, a document, or a library.

In step 308, a query response, from the second application, is received that includes an access indication. For example, query manager 218 is also configured to receive the query response from the second application for the query provided in step 306 above. Query responses may include access indications that indicate access should granted or denied, i.e., grant indications and deny indications, that are linked to the information provided in the query.

In step 310, it is determined whether the access indication includes a grant indication or a deny indication. That is, access manager 220 is configured to determine if the query responses received in step 308 include grant indications or deny indications for the resource requested in the queries. If the query response includes one or more grant indications sufficient to allow access to the resource, flowchart 300 proceeds to step 312. Otherwise, if the query response does not include sufficient grant indications or includes deny indications, flowchart 300 proceeds to step 314.

In step 312, the request is granted based on the access indication including a grant indication. For instance, access manager 220 is configured to grant the request based on a determination in step 310 that grant indications in the query response indicate access to the resource of the first application should be allowed. Access manager 220 may be configured to provide notifications of access being granted to a user via communicator 210 and/or UI(s) 212. Additionally, the first application may be similarly notified/instruction that access to the resource for the user is to be allowed.

In step 314, the request is denied based on the access indication including a deny indication. For example, access manager 220 is configured to deny the request based on a determination in step 310 that deny indications, or insufficient grant indications, in the query response indicate access to the resource of the first application should be not allowed. Access manager 220 may be configured to provide notifications of access being denied to a user via communicator 210 and/or UI(s) 212. Additionally, the first application may be similarly notified/instruction that access to the resource for the user is not to be allowed.

Subsequent to step 312 or step 314, flowchart 300 ends.

It is also contemplated herein that other users, or the same user, may request different resources of the first application that may require externally-delegated authorization using a third application, i.e., a different application from the second application that is described above in flowchart 300. That is, different resources of an application may require different credentials for access thereto. In such embodiments, the steps of flowchart 300 may be performed for another resource of the first application where, instead of the second application being queried, a different third application is queried with an application identifier and permission information of the third application. As similarly described with respect to flowchart 300, the application identifier and permission information of the third application may be stored in, and obtained from, a data structure of memory 206, e.g., resource configurations 222.

In other embodiments, the memory data structures described herein may also associate a resource of the first application with another application identifier and other permission information of a third application, in addition to the association with the second application, as described in flowchart 300 and elsewhere herein. That is, a resource of an application may require authorization from more than one other application.

For example, FIG. 4 shows a flowchart 400 for externally-delegated access control and authorization, in accordance with an example embodiment. UX service 208 and/or back-end service 214 of workflow system host 202 in system 200 may operate according to flowchart 400. Further structural and operational examples will be apparent to persons skilled in the relevant art(s) based on the following description. Flowchart 400 may be a further embodiment of flowchart 300 of FIG. 3, and is described as follows with respect to system 100 of FIG. 1 and system 200 of FIG. 2.

Flowchart 400 may be performed in parallel, in whole or in part, with steps of flowchart 300, e.g., subsequent to a request being received in step 302 and application identifier and permission information being obtained in step 304. That is, the resource of the first application requested for access in step 302 may require authorization from more than one other application as indicated by the permission information obtained in step 304. Further details and embodiments regarding data structures, application identifiers, and permission information is provided in the next subsection with respect to FIGS. 5-6.

Flowchart 400 begins at step 402. In step 402, an additional query is provided to a third application identified by another application identifier, the additional query including a user identifier and other permission information. For instance, query manager 218 is also configured to generate and provide a query to a third application associated with the application identifier that is different from the second application noted above in flowchart 300 of FIG. 3. As similarly described above, the additional query may include a user identifier and the permission information obtained in step 304 for the third application, where the permission information may include indications or identifiers of the first application and/or the resource requested. In other words, as noted above, more than one set of permission information may be provided in queries for a single resource request.

In embodiments, the third application may have a different type of authorization than the first application and/or the second application. Accordingly, query manager 218 is configured to generate and provide queries that are extensible across different authorization types and/or platforms, e.g., via contract. In embodiments, the second application may be an information sharing application or any other type of application described herein, and the resource of the second application may be one of a list, a document, or a library or any other type of resource described herein.

In step 404, an additional query response, from the third application, is received that includes an additional access indication. For example, query manager 218 is also configured to receive the additional query response from the third application for the additional query provided in step 402 above. These additional query responses may include additional access indications that indicate access should granted or denied, i.e., additional grant indications and additional deny indications, that are linked to the information provided in the query.

In step 406, it is determined whether the additional access indication includes an additional grant indication or an additional deny indication. That is, access manager 220 is configured to determine if the additional query responses received in step 404 include additional grant indications or additional deny indications for the resource of the first application requested in the additional queries. If the additional query response includes one or more additional grant indications sufficient to allow access to the resource, flowchart 400 proceeds to step 408. Otherwise, if the additional query response does not include sufficient additional grant indications or includes additional deny indications, flowchart 400 proceeds to step 410.

In step 408, the request is granted also based on the additional access indication including an additional grant indication. For instance, access manager 220 is configured to grant the request based on a determination in step 310 that grant indications in the query response indicate access to the resource of the first application should be allowed, and also based on a determination in step 406 that additional grant indications in the additional query response indicate access to the resource of the first application should be allowed. Access manager 220 may be configured to provide notifications of access being granted as described above.

In step 410, the request is also denied based on the additional access indication including an additional deny indication. For example, access manager 220 is configured to deny the request based on a determination in step 310 that deny indications, or insufficient grant indications, in the query response indicate access to the resource of the first application should be not allowed, and/or also based on a determination in step 406 that additional deny indications, or insufficient additional grant indications, in the additional query response indicate access to the resource of the first application should be not allowed. Access manager 220 may be configured to provide notifications of access being denied to a user as described above.

Subsequent to step 408 or step 410, flowchart 400 ends.

B. Example Embodiments for Resource Configurations and Permissions Resources

As noted above with respect to FIG. 1, application/service hosts may include resources, which may be permissions resources. Such resources may include permissions for users in the form of lists, documents, libraries, etc., and permissions may include sets of user identifiers linked with permissions for authorization models specific to external applications. Additionally, resource configurations may be stored in application/service hosts Turning now to FIG. 5, a block diagram of user permission configurations 500 ("configurations 500" herein) for resources is shown. Configurations 500 is described as follows.

As illustrated, configurations 500 exemplarily shows SaaS host 116 and resource(s) 120, which may be permissions resources. Resource(s) 120 includes entries 504 that associate different users with permissions for a SaaS application hosted by SaaS host 116. For example, a user U1 is shown as having permissions P1, such as a "run-only" user permission. A user U2 is shown as having permissions P2, such as an "editor" user who may have modify privileges. A user U3 is shown as having permissions P2 and P3, as an "editor" and an "owner" user that may also have delete privileges. Any number of users (to user Un) may be included for any number of permissions (Pm). It should be noted that while individual users are shown, it is contemplated that users may be grouped for given permissions, i.e., that a group of users may share a common permission(s).

An administrator of an administrator client 502 may manage the permissions and users included in resource(s) 120. Administrator client 502 may be a further embodiment of client device 102 of FIG. 1, or may be a portion/interface of SaaS host 116, in different embodiments. In some embodiments, permissions generation may be automated for users or groups of users, including default permissions being initially set for SaaS host 116 and/or applications thereof.

Turning now to FIG. 6, a block diagram of resource configurations 600 ("configurations 600" herein) is shown. Configurations 600 is described as follows.

As illustrated, configurations 600 exemplarily shows workflow service host 202 and resource configurations 222 of resources for workflow applications, e.g., workflows. Resource configurations 222 includes application identifiers and permissions 224 which includes entries 604 shown as resource sets. The resource sets of entries 604 associate different resources with application/service identifiers and permission information, as described herein. For example, a resource R1 is shown as being delegated to application/service S1 and having permission information P1. A resource R2 is shown as also being delegated to application/ service S1 but having permission information P2. A resource R3 is shown as being delegated to application/service S2 and having permission information P3.

A resource R4 is shown as being delegated to both application/service S1 and application/service S3, respectively having permission information P1 and permission information P4. In this example, consider a resource (workflow) that is associated with an information sharing application and an email service. In such a case, a user may be required to have permissions for both the information sharing application and the email service in order to access or take action on the workflow.

A resource R5 is shown as being delegated to application/service S3, while having permission information P4 and permission information P5. That is, embodiments contemplate that more than one permission may be required to access a resource. While an &' (i.e., 'and') is shown here as requiring both permissions, embodiments also include the use of 'or' for a user being required to have at least one of multiple permissions for resource access.

Any number of resources (Rz) may be included for any number of applications/services (Sx) and permissions (Py). It should be noted that while individual resources are shown, it is contemplated that resources may be grouped for given sets of applications/services and permissions.

Resource configurations 222 may also include a users list 606 having entries 608 that specify associations between users and resources to indicate whether a user may be granted or denied access to the enumerated resource(s). In such embodiments, providing a request to a delegated-to application, as described above, may be unnecessary and not performed. For example, a user U1 may be explicitly granted access to a resource R1, and a user U2 may be explicitly granted access to a resource R3. In contrast, a user U3 may be explicitly denied access to resource R3. Thus, requests for resource accesses may be handled without querying a delegated-to application, in embodiments. As similarly noted above, users may be grouped for granting/denying accesses to resources.

A resource owner of a resource owner client 602 may manage the applications/services and permissions associated with resources in resource configurations 222 and application identifiers and permissions 224, as well as in users list 606. Resource owner client 602 may be a further embodiment of client device 102 of FIG. 1, or may be a portion/interface of a host system as descried herein, in different embodiments. In some embodiments, resource sets may be automatically generated for resource associations, including defaults being initially set.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including, such as system 100 of FIG. 1, system 200 of FIG. 2, configurations 500 of FIG. 5, and configurations 600 of FIG. 6, along with any components and/or subcomponents thereof, as well any operations and flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 7:
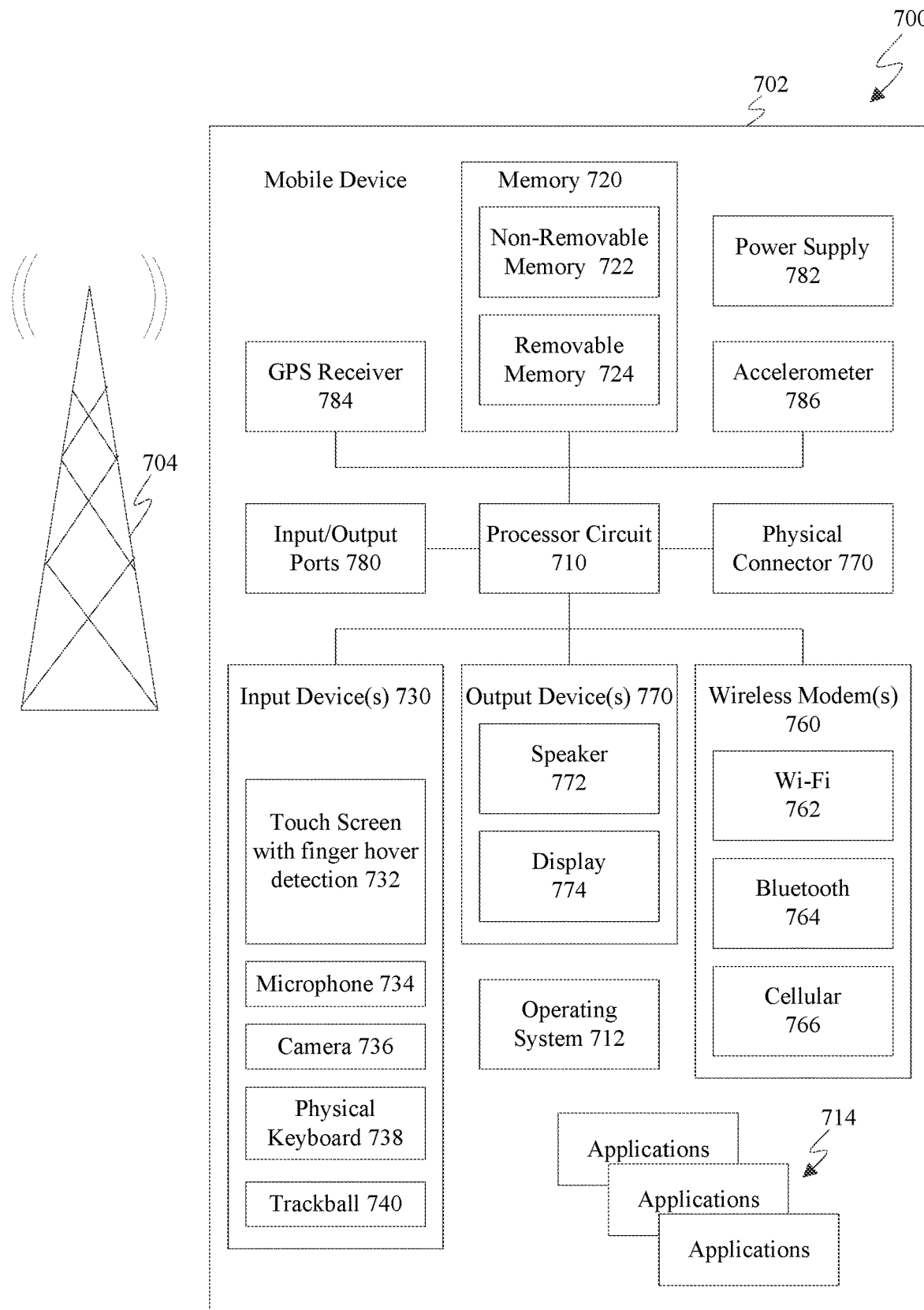
FIG. 7 shows a block diagram of an example mobile device that may be used to implement various example embodiments.

FIG. 7 is a block diagram of an exemplary mobile system 700 that includes a mobile device 702 that may implement embodiments described herein. For example, mobile device 702 may be used to implement any system, client, or device, or components/subcomponents thereof, in the preceding sections. As shown in FIG. 7, mobile device 702 includes a variety of optional hardware and software components. Any component in mobile device 702 can communicate with any other component, although not all connections are shown for ease of illustration. Mobile device 702 can be any of a variety of computing devices (e.g., cell phone, smart phone, handheld computer, Personal Digital Assistant (PDA), etc.) and can allow wireless two-way communications with one or more mobile communications networks 704, such as a cellular or satellite network, or with a local area or wide area network.

Mobile device 702 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components of mobile device 702 and provide support for one or more application programs 714 (also referred to as "applications" or "apps"). Application programs 714 may include common mobile computing applications (e.g., e-mail applications, calendars, contact managers, web browsers, messaging applications) and any other computing applications (e.g., word processing applications, mapping applications, media player applications).

Mobile device 702 can include memory 720. Memory 720 can include non-removable memory 722 and/or removable memory 724. Non-removable memory 722 can include RAM, ROM, flash memory, a hard disk, or other well-known memory devices or technologies. Removable memory 724 can include flash memory or a Subscriber Identity Module (SIM) card, which is well known in GSM communication systems, or other well-known memory devices or technologies, such as "smart cards." Memory 720 can be used for storing data and/or code for running operating system 712 and application programs 714. Example data can include web pages, text, images, sound files, video data, or other data to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing one or more of system 100 of FIG. 1, system 200 of FIG. 2, configurations 500 of FIG. 5, and configurations 600 of FIG. 6, along with any components and/or subcomponents thereof, as well any operations and flowcharts/flow diagrams described herein and/or further examples described herein.

Mobile device 702 can support one or more input devices 730, such as a touch screen 732, a microphone 734, a camera 736, a physical keyboard 738 and/or a trackball 740 and one or more output devices 750, such as a speaker 752 and a display 754. Other possible output devices (not shown) can include piezoelectric or other haptic output devices. Some devices can serve more than one input/output function. For example, touch screen 732 and display 754 can be combined in a single input/output device. Input devices 730 can include a Natural User Interface (NUI).

One or more wireless modems 760 can be coupled to antenna(s) (not shown) and can support two-way communications between processor 710 and external devices, as is well understood in the art. Modem 760 is shown generically and can include a cellular modem 766 for communicating with the mobile communication network 704 and/or other radio-based modems (e.g., Bluetooth 764 and/or Wi-Fi 762). At least one wireless modem 760 is typically configured for communication with one or more cellular networks, such as a GSM network for data and voice communications within a single cellular network, between cellular networks, or between the mobile device and a public switched telephone network (PSTN).

Mobile device 702 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components of mobile device 702 are not required or all-inclusive, as any components can be deleted and other components can be added as would be recognized by one skilled in the art.

In an embodiment, mobile device 702 is configured to implement any of the above-described features of flowcharts/embodiments herein. Computer program logic for performing any of the operations, steps, and/or functions described herein may be stored in memory 720 and executed by processor 710.

Figure 8:
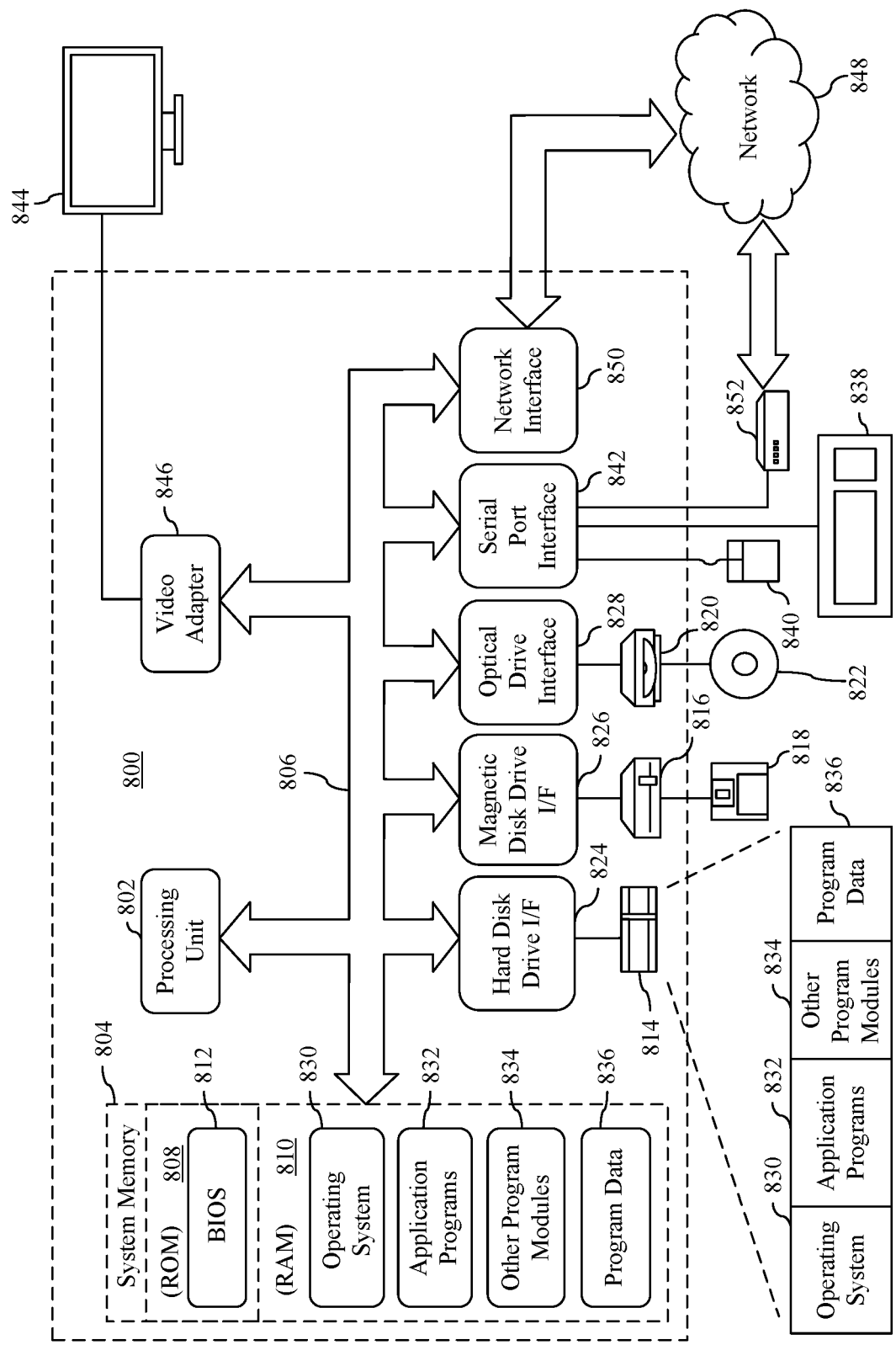
FIG. 8 shows a block diagram of an example computing device that may be used to implement embodiments.

FIG. 8 depicts an exemplary implementation of a computing device 800 in which embodiments may be implemented. For example, embodiments described herein may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems and/or game consoles, etc., as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing embodiments described herein, such as system 100 of FIG. 1, system 200 of FIG. 2, configurations 500 of FIG. 5, and configurations 600 of FIG. 6, along with any components and/or subcomponents thereof, as well any operations and flowcharts/flow diagrams described herein and/or further examples described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium," etc., are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including memory 820 of FIG. 8). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any operation, process, flowchart, and/or flow diagram described herein may not be performed. Moreover, steps or operations in addition to or in lieu of those in any operation, process, flowchart, and/or flow diagram described herein may be performed. Further, in examples, one or more operations of any operation, process, flowchart, and/or flow diagram described herein may be performed out of order, in an alternate sequence, or partially (or completely) concurrently with each other or with other operations.

While the described embodiments provide examples in the context of workflow resource access via workflow service hosts (e.g., workflow service host 104, workflow service host 202, etc.) that externally delegate access control and authorization to other applications/services, such embodiments are exemplary and non-limiting in nature and are provided to illustrate the techniques described herein. That is, embodiments are contemplated in which any other type of host and application/service, e.g., SaaS applications as described herein, may receive requests for resources and externally delegate access control and authorization to different applications/services.

The described embodiments herein improve system efficiency when handling requests to access resources. For example, because there is no synchronization for authorization information, permissions, user lists, etc. required between applications, or for centralized services as in prior solutions, network traffic for applications is reduced, processing cycles are freed up and reduced, and memory footprints are reduced. Additionally, resource requests are handled more quickly according to the described embodiments.

Moreover, queries between applications include less payload. That is, resource configurations may persist only the minimum information required to identify a delegated-to resource and associated permission information for resource requests. In this way, extracted parameters from requests coupled with the resource configuration information provide specifically directed queries with less payload.

The particular arrangement and location of the described workflow service hosts and systems is a technical improvement over the current state of the art for handling access control and authorization. As noted above, current solutions require synchronizing authorization models together for either 1-way or 2-way access control. This approach is inefficient with respect to network, memory/storage, and processing resource usage, and restricts scalability. The embodiments herein provide for versatile and dynamic access delegation through disparate applications/services that enables, through its distributed, one-to-many architecture, any application/service host to effectively operate as a "centrally-located" entity that communicates with each other application/service host. However, unlike the prior solutions, synchronization is not required, and thus the described embodiments are more efficient and are scalable to any number of applications for delegations. Additionally, the embodiments herein dynamically allow for a request for access to any resource of an application by any user to be appropriately delegated to another application for authorization by utilizing resource configurations to identify appropriate application identifiers and permission information for a given application. That is, the described workflow service hosts and systems are adaptable to delegate any resource requests for different users to any delegated-to application from the delegating application of the resource (i.e., from a single, accessible location). Dynamic and efficient external delegation for access control and authorization that is technology-based is thus described and enabled. Therefore, the described embodiments improve the technological process for delegation at least through the non-conventional and non-generic arrangement of the hosts and systems herein.

Furthermore, the described embodiments do not exist in software implementations for delegation of access control and authorization, e.g., to allow unlimited scaling without synchronization of authorization models for applications/services.

The additional examples and embodiments described in this Section may be applicable to examples disclosed in any other Section or subsection of this disclosure.

Systems and methods for externally-delegated access control and authorization of applications, such as SaaS applications, are described herein. For instance, an access control and authorization system is described that includes a processor and a memory that stores program code of a first application. The program code of the first application is configured to be executed by the processor. The program code of the first application includes first program code configured to receive a request from a client device for access by a user to a resource of the first application. The program code of the first application also includes second program code configured to obtain an application identifier and permission information from a memory data structure that associates the resource of the first application with the application identifier and the permission information. The program code of the first application also includes third program code configured to provide a query to a second application identified by the application identifier, the query including a user identifier and the permission information, and receive from the second application a query response that includes an access indication. The program code of the first application also includes fourth program code being configured to grant the request based on the access indication including a grant indication. In embodiments, the fourth program code is configured to deny the request based on the access indication including a deny indication.

In embodiments, the first application is a workflow development application, the resource of the first application is a workflow, and the permission information is associated with a resource of the second application that is referenced by the workflow. The second application may be an information sharing application, and the resource of the second application may be one of a list, a document, or a library. The first application and/or the second application may be a software-as-a-service (SaaS) application.

The memory data structure may also associate another resource of the first application with another application identifier and other permission information of a third application. Accordingly, the first program code is configured to receive another request for access by another user to the other resource of the first application from another client device, and the second program code is configured to obtain the other application identifier and the other permission information from the memory data structure. The third program code may be configured to provide another query to the third application identified by the other application identifier, the other query including another user identifier and the other permission information, and receive from the third application another query response that includes another access indication. The fourth program code may be further configured to grant the other request based on the other access indication including another grant indication, and to deny the other request based on the other access indication including another deny indication.

The memory data structure may also associate the resource of the first application with another application identifier and other permission information of a third application. Accordingly, the third program code may be configured to provide an additional query to a third application identified by the other application identifier, the additional query including the user identifier and the other permission information, and then to receive from the third application an additional query response that includes an additional access indication. The fourth program code may be configured to grant or deny the request also based on the additional access indication including an additional grant indication, and to deny the request also based on the additional access indication including an additional deny indication.

In an embodiment of the system, the system is a cloud-based system, the client device is remotely located from the first application, and the request from the client device is received over a network.

A computer-implemented method is also described. The method includes receiving a request for access by a user to a resource of a first application, and obtaining from a memory data structure an application identifier and permission information associated with the resource of the first application. The method also includes providing a query to a second application that has a different authorization model than the first application, the query including a user identifier and the permission information, receiving from the second application a query response that includes an access indication, and granting the request based on the access indication including a grant indication.

In an embodiment, the computer-implemented method includes denying the request based on the access indication including a deny indication.

In an embodiment of the computer-implemented method, the first application is a workflow development application, the resource of the first application is a workflow, and the permission information is associated with a resource of the second application that is referenced by the workflow. In embodiments, the second application is an information sharing application, and the resource of the second application is one of a list, a document, or a library.

In an embodiment of the computer-implemented method, at least one of the first application or the second application is a software-as-a-service (SaaS) application.

In an embodiment of the computer-implemented method, the memory data structure also associates another resource of the first application with another application identifier and other permission information of a third application. In the embodiment, the computer-implemented method further includes receiving another request for access by another user to the other resource of the first application from another client device, and obtaining the other application identifier and the other permission information from the memory data structure. In the embodiment, the method also includes providing another query to the third application identified by the other application identifier, the other query including another user identifier of the and the other permission information, receiving, from the third application, another query response that includes another access indication, and granting or denying the other request based on the other access indication including a grant indication or a deny indication, respectively.

In an embodiment of the computer-implemented method, the memory data structure also associates the resource of the first application with another application identifier and other permission information of a third application. In the embodiment, the computer-implemented method further includes providing an additional query to the third application identified by the other application identifier, the additional query including the user identifier and the other permission information. The method also includes receiving, from the third application, an additional query response that includes an additional access indication, and granting or denying the request also based on the additional access indication including an additional grant indication or an additional deny indication, respectively.

In an embodiment of the computer-implemented method, the computer-implemented method is performed in a cloud-based system, the request is received from a client device that is remotely located from the first application, and the request received from the client device is received over a network.

Embodiments for computer-readable storage medium having program instructions recorded thereon that, when executed by a processing device, perform a method for externally-delegated access control and authorization are also described herein. Accordingly, such a computer-readable storage medium is also described. The method performed when the program instructions are executed includes receiving a request over a network, from a remote client device, for access by a user to a resource of a first application, and obtaining, from a memory data structure, an application identifier and permission information associated with the resource of the first application. The method also includes providing a query over the network to a second application that has a different authorization model than the first application, the query including a user identifier and the permission information. The method further includes receiving, from the second application, a query response that includes an access indication, and granting the request based on the access indication including a grant indication.

In an embodiment of the computer-readable storage medium, the method includes denying the request based on the access indication including a deny indication.

In an embodiment of the computer-readable storage medium, the first application is a workflow development application, the resource of the first application is a workflow, and the permission information is associated with a resource of the second application that is referenced by the workflow. In an embodiment, the second application is an information sharing application, and the resource of the second application is one of a list, a document, or a library.

In an embodiment of the computer-readable storage medium, at least one of the first application or the second application is a software-as-a-service (SaaS) application.

In an embodiment of the computer-readable storage medium, the memory data structure also associates another resource of the first application with another application identifier and other permission information of a third application. In the embodiment, the method further includes receiving another request for access by another user to the other resource of the first application from another client device, and obtaining the other application identifier and the other permission information from the memory data structure. The method also includes providing another query to the third application identified by the other application identifier, the other query including another user identifier of the and the other permission information, receiving, from the third application, another query that includes another access indication, and granting or denying the other request based on the other access indication including another grant indication or another deny indication, respectively.

In an embodiment of the computer-readable storage medium, the memory data structure also associates the resource of the first application with another application identifier and other permission information of a third application. In the embodiment, the method further includes providing an additional query to the third application identified by the other application identifier, the additional query including the user identifier and the other permission information. The method also includes receiving, from the third application, an additional query response that includes an additional access indication, and granting or denying the request also based on the additional access indication including an additional grant indication or an additional deny indication, respectively.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. An access control and authorization system comprising:
   a processor; and
   a memory that stores program code of a first application that is a software-as-a-service (SaaS) workflow development application, the program code of the first application being configured to be executed by the processor, the program code of the first application including:
   first program code configured to:
   receive a request, from a client device, for access by a user to a workflow resource of the first application;
   second program code configured to:
   obtain an application identifier and permission information from a memory data structure that associates the workflow resource of the first application with the application identifier and the permission information, the permission information also being associated with a resource of an information sharing application that is referenced by the workflow and that comprises a list, a document, or a library;
   third program code configured to:
   provide a query to the information sharing application that has a different authorization model than the first application, the query including a user identifier and the permission information, and
   receive, from the information sharing application, a query response that includes an access indication; and
   fourth program code configured to:
   grant the request based on the access indication including a grant indication.

2. The system of claim 1, wherein the information sharing application is a SaaS application.

3. The system of claim 1, wherein the fourth program code is further configured to:
   deny the request based on the access indication including a deny indication.

4. The system of claim 1, wherein the memory data structure also associates another resource of the first application with another application identifier and other permission information of a third application;

wherein the first program code is configured to:
receive another request for access by another user to the other resource of the first application from another client device;
wherein the second program code is configured to:
obtain the other application identifier and the other permission information from the memory data structure;
wherein the third program code is configured to:
provide another query to the third application identified by the other application identifier, the other query including another user identifier of the other user and the other permission information, and
receive, from the third application, another query response that includes another access indication; and
wherein the fourth program code is further configured to:
grant the other request based on the other access indication including another grant indication, and
deny the other request based on the other access indication including another deny indication.

5. The system of claim 4, wherein the third application is at least one of an email service, a productivity application, or social media service.

6. The system of claim 1, wherein the memory data structure also associates the workflow resource of the first application with another application identifier and other permission information of a third application;
wherein the third program code is configured to:
provide an additional query to the third application identified by the other application identifier, the additional query including the user identifier and the other permission information, and
receive, from the third application, an additional query response that includes an additional access indication; and
wherein the fourth program code is configured to:
grant the request also based on the additional access indication including an additional grant indication, and
deny the request also based on the additional access indication including an additional deny indication.

7. A computer-implemented method comprising:
receiving a request for access by a user to a workflow resource of a first application that is a software-as-a-service (SaaS) workflow development application;
obtaining, from a memory data structure, an application identifier and permission information that associates the workflow resource of the first application with the application identifier and the permission information, the permission information also being associated with a resource of an information sharing application that is referenced by the workflow and that comprises a list, a document, or a library;
providing a query to the information sharing application that has a different authorization model than the first application, the query including a user identifier and the permission information;
receiving, from the information sharing application, a query response that includes an access indication; and
granting the request based on the access indication including a grant indication.

8. The computer-implemented method of claim 7, wherein the information sharing application is a SaaS application.

9. The computer-implemented method of claim 7, wherein the memory data structure also associates another resource of the first application with another application identifier and other permission information of a third application;
the computer-implemented method further comprising:
receiving another request for access by another user to the other resource of the first application from another client device;
obtaining the other application identifier and the other permission information from the memory data structure;
providing another query to the third application identified by the other application identifier, the other query including another user identifier of the and the other permission information;
receiving, from the third application, another query response that includes another access indication; and
granting or denying the other request based on the other access indication including a grant indication or a deny indication, respectively.

10. The computer-implemented method of claim 9, wherein the third application is at least one of an email service, a productivity application, or social media service.

11. The computer-implemented method of claim 7, wherein the memory data structure also associates the workflow resource of the first application with another application identifier and other permission information of a third application;
the computer-implemented method further comprising:
providing an additional query to the third application identified by the other application identifier, the additional query including the user identifier and the other permission information;
receiving, from the third application, an additional query response that includes an additional access indication; and
granting or denying the request also based on the additional access indication including an additional grant indication or an additional deny indication, respectively.

12. A computer-readable storage medium having program instructions recorded thereon that, when executed by a processing device, perform a method for access control and authorization, the method comprising:
receiving a request over a network, from a remote client device, for access by a user to a workflow resource of a first application that is a software-as-a-service (SaaS) workflow development application;
obtaining, from a memory data structure, an application identifier and permission information that associates the resource workflow of the first application with the application identifier and the permission information, the permission information also being associated with a resource of an information sharing application that is referenced by the workflow and that comprises a list, a document, or a library;
providing a query over the network to the information sharing application that has a different authorization model than the first application, the query including a user identifier and the permission information;
receiving, from the information sharing application, a query response that includes an access indication; and
granting the request based on the access indication including a grant indication.

13. The computer-readable storage medium of claim 12, wherein the information sharing application is a SaaS application.

14. The computer-readable storage medium of claim 12, wherein the memory data structure also associates another resource of the first application with another application identifier and other permission information of a third application; and wherein the method further comprises:

receiving another request for access by another user to the other resource of the first application from another client device;

obtaining the other application identifier and the other permission information from the memory data structure;

providing another query to the third application identified by the other application identifier, the other query including another user identifier of the and the other permission information;

receiving, from the third application, another query that includes another access indication; and granting or denying the other request based on the other access indication including another grant indication or another deny indication, respectively.

15. The computer-readable storage medium of claim 14, wherein the third application is at least one of an email service, a productivity application, or social media service.

16. The computer-readable storage medium of claim 12, wherein the memory data structure also associates the workflow resource of the first application with another application identifier and other permission information of a third application; and wherein the method further comprises:

providing an additional query to the third application identified by the other application identifier, the additional query including the user identifier and the other permission information;

receiving, from the third application, an additional query response that includes an additional access indication; and granting or denying the request also based on the additional access indication including an additional grant indication or an additional deny indication, respectively.

\* \* \* \* \*